United States Patent
Morris

(10) Patent No.: US 11,564,535 B2
(45) Date of Patent: Jan. 31, 2023

(54) FOOD PAN FENCE

(71) Applicant: Gordon Morris, Honolulu, HI (US)

(72) Inventor: Gordon Morris, Honolulu, HI (US)

( * ) Notice: Subject to any disclaimer, the term of this patent is extended or adjusted under 35 U.S.C. 154(b) by 334 days.

(21) Appl. No.: 16/865,403

(22) Filed: May 3, 2020

(65) Prior Publication Data
US 2020/0329918 A1 Oct. 22, 2020

Related U.S. Application Data

(63) Continuation of application No. 14/987,606, filed on Jan. 4, 2016, now Pat. No. 10,638,889, which is a continuation-in-part of application No. PCT/US2014/045284, filed on Jul. 2, 2014.

(60) Provisional application No. 61/878,627, filed on Sep. 17, 2013, provisional application No. 61/842,063, filed on Jul. 2, 2013.

(51) Int. Cl.
*A47J 47/19* (2006.01)
*A47J 36/06* (2006.01)

(52) U.S. Cl.
CPC .............. *A47J 47/19* (2013.01); *A47J 36/06* (2013.01)

(58) Field of Classification Search
CPC .. A47J 27/14; A47J 27/18; A47J 36/06; A47J 47/16; A47J 47/19; A47J 39/00
USPC ........... 99/645, 646 C; 220/4.03; 211/11, 45, 211/85.4, 126.2, 194
See application file for complete search history.

(56) References Cited

U.S. PATENT DOCUMENTS

| | | | | |
|---|---|---|---|---|
| 1,701,670 A | * | 2/1929 | Feldman | A47D 13/065 256/25 |
| 4,320,837 A | * | 3/1982 | Carroll | B65D 21/041 206/505 |
| 5,542,347 A | * | 8/1996 | Joseph | A47J 37/101 99/422 |
| 6,908,004 B2 | * | 6/2005 | Barr | B65D 21/086 220/4.03 |
| 2007/0175790 A1 | * | 8/2007 | Fernandez | B65D 21/045 206/503 |
| 2011/0037237 A1 | * | 2/2011 | Hassell | B65D 21/0215 206/518 |
| 2012/0031910 A1 | * | 2/2012 | Hogestyn | A47J 36/30 220/573.1 |

* cited by examiner

*Primary Examiner* — Dana Ross
*Assistant Examiner* — James F Sims, III
(74) *Attorney, Agent, or Firm* — Hawaii Patent Services; Nathaniel K. Fedde

(57) ABSTRACT

Provided herein are food pan fences, methods of using food pan fences, and methods of manufacturing food pan fences. A food pan fence of the invention can, for example, comprise side walls configured to extend above the sidewalls of a food pan and prevent cross-contamination of food to or from an adjacent food pan. Optionally, the food pan comprises an inner lip at the wall base. Optionally, the food pan further comprises one or more lateral walls (e.g. front wall and back wall) connecting the sidewalls, wherein the one or more lateral walls comprises a low section configured to allow dishing food from the food pan there through. In one embodiment, the invention provides a food bar comprising a plurality of food pans and a plurality of fences configured for the food pans. In one embodiment, the invention provides a cafeteria comprising the food bar.

20 Claims, 17 Drawing Sheets

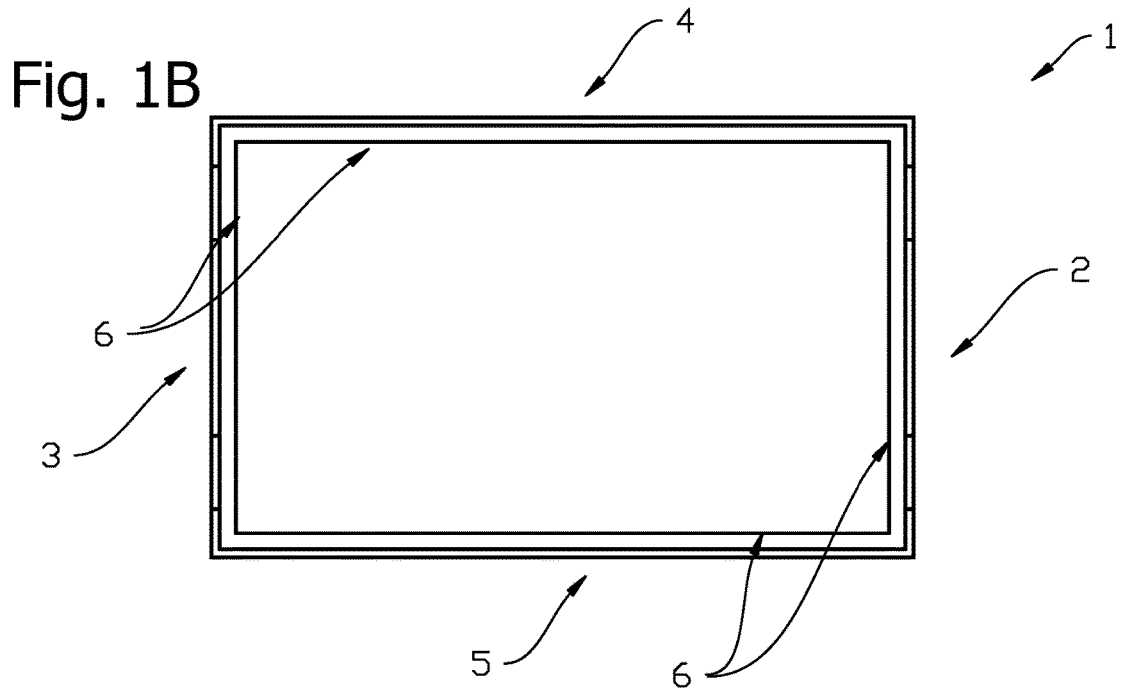
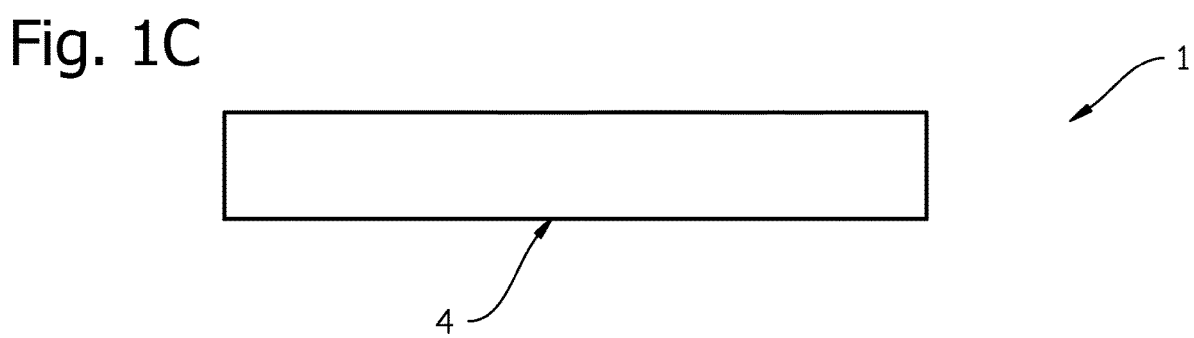
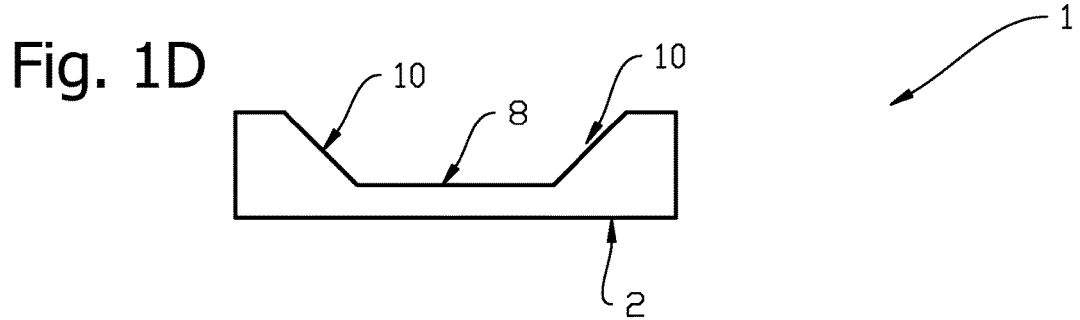

Fig. 4A
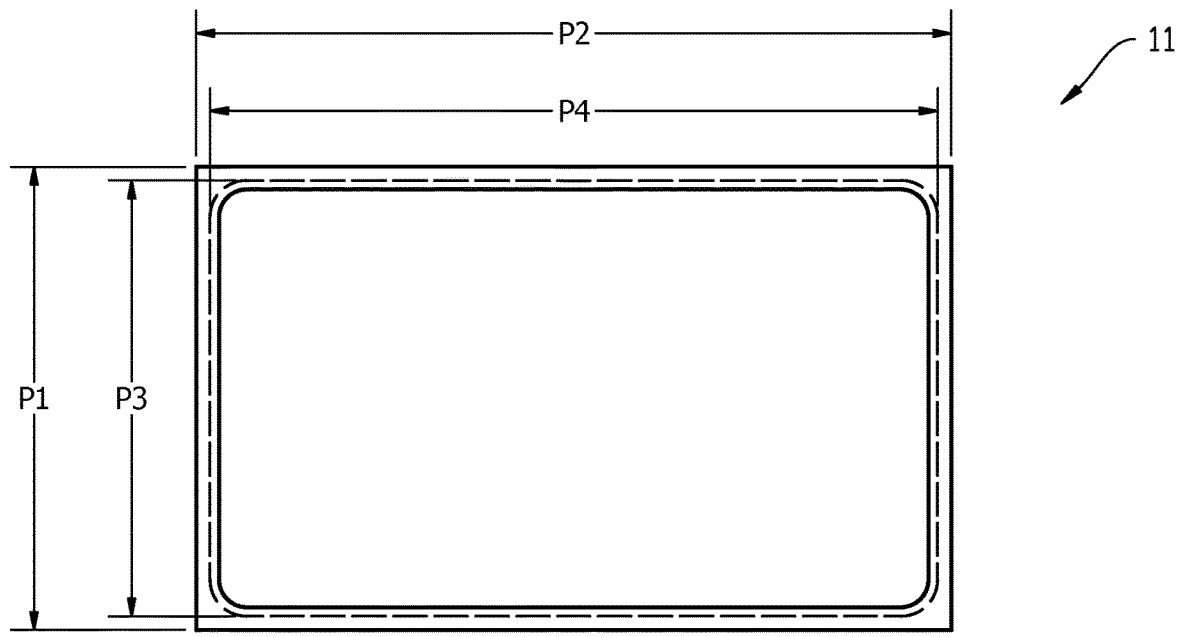
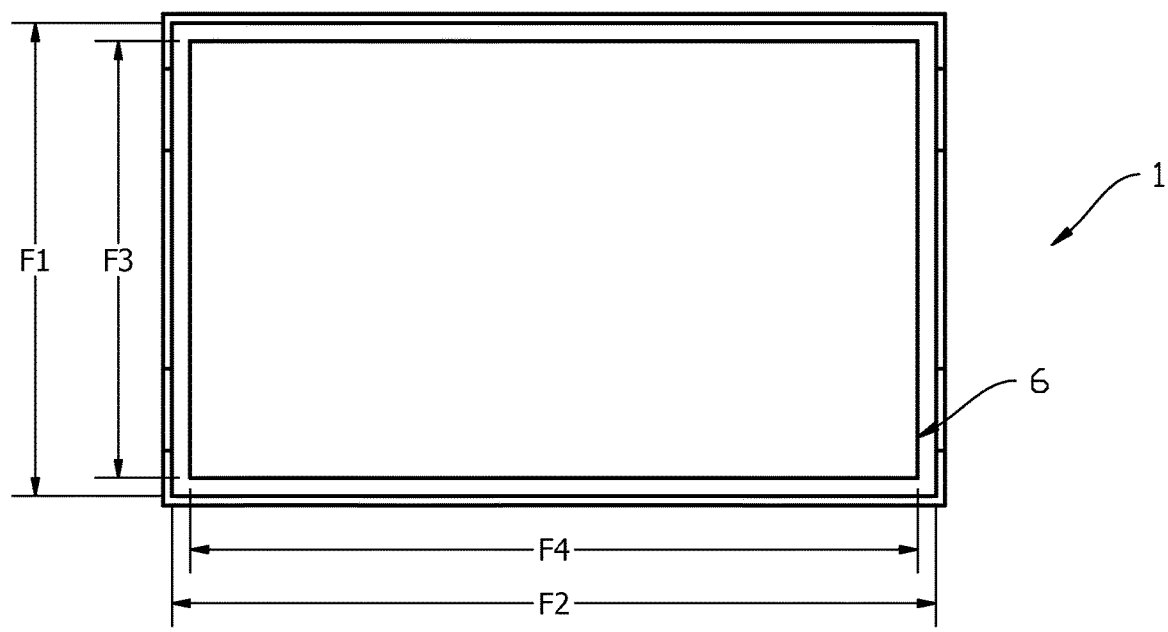

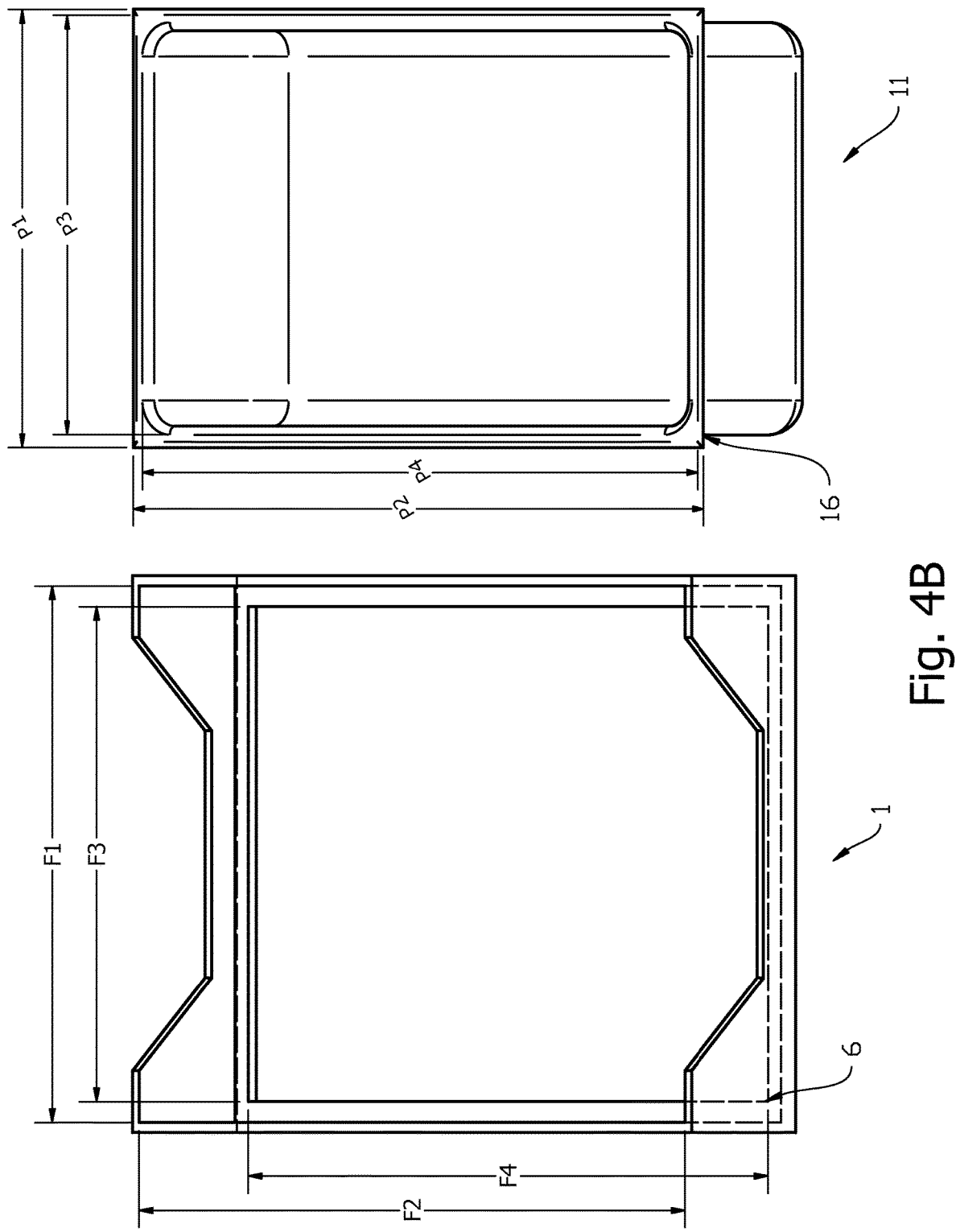

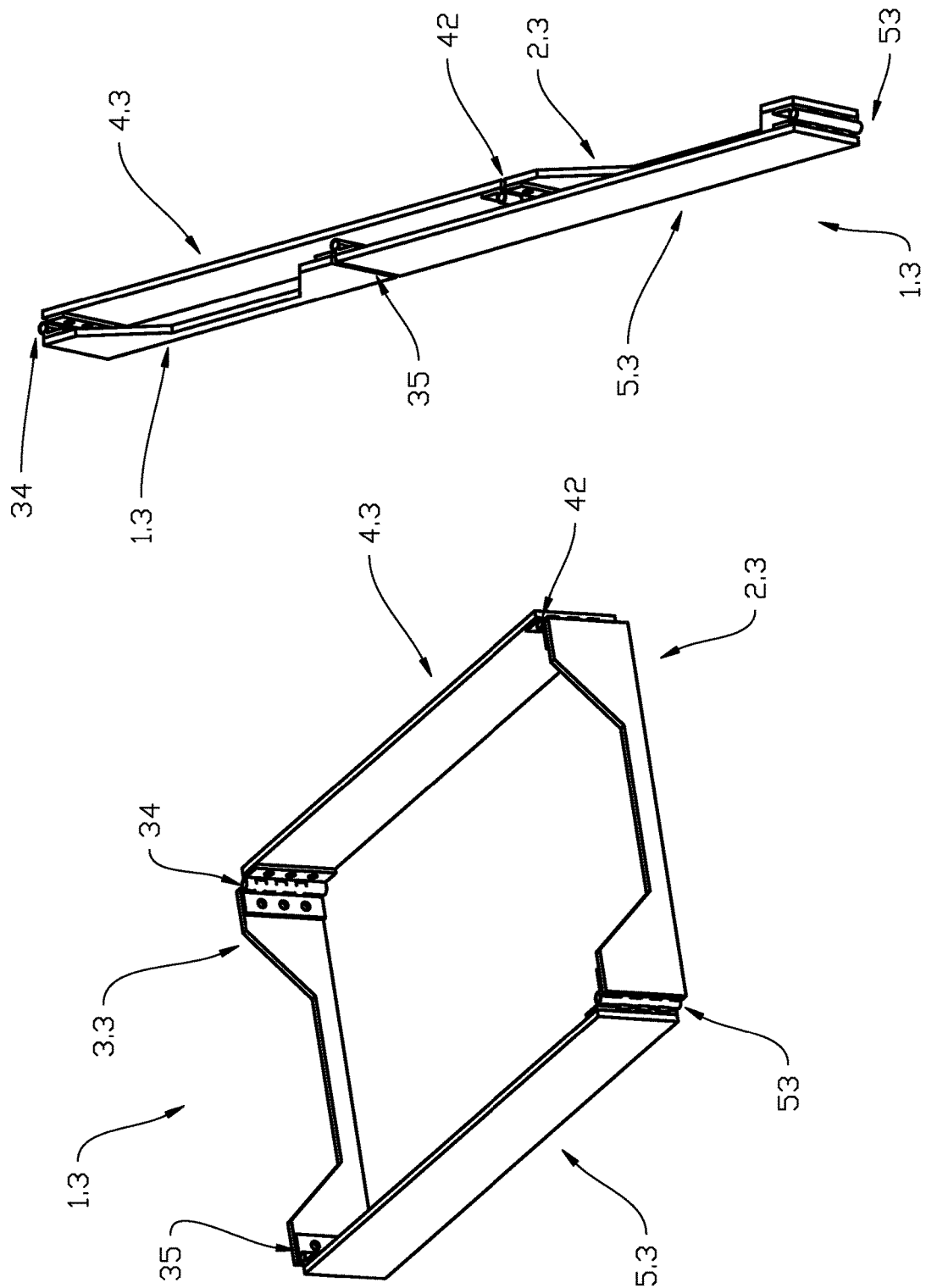

FOOD PAN FENCE

CROSS-REFERENCE TO RELATED APPLICATIONS

This application is a continuation-in-part of International Application No. PCT/US2014/045284 filed 2 Jul. 2014, which claims priority to U.S. Provisional Application No. 61/842,063 filed 2 Jul. 2013 and U.S. Provisional Application No. 61/878,627 filed 17 Sep. 2013, each of which is hereby incorporated by reference.

TECHNICAL FIELD

The present invention relates to fences for food pans.

BACKGROUND

Food allergies are adverse immunologic reactions to food, often characterized by an acute inflammatory response in one or more organs such as the skin, gastrointestinal tract, and respiratory system. In severe food allergic reactions, compromised cardiovascular and/or respiratory systems can cause anaphylactic shock and even death in some cases. According to the American Academy of Allergy Asthma and Immunology, peanut allergies in children increased twofold from 1997 to 2002. Some studies suggest about four percent of the U.S. population—more than 11 million people—have food allergies. Ten years ago, that figure was believed to be only one percent.

Foods commonly causing these reactions in children are: milk, eggs, peanuts, soy, wheat, tree-nuts, fish and shellfish, which are abundant at many food vendors. Although food allergen testing kits are available, there has yet be provided a feasible method of accurately testing food at commercial scale food vendors, e.g. in cafeterias and other food bar environments. Thus, identification and control of food allergens is a requisite for food safety.

Hazard Analysis and Critical Control Points (HACCP) is a preventative system used by both the Food and Drug Administration (FDA) and the United States Department of Agriculture (USDA) to ensure food safety. Rather than inspect a final food product, the HACCP system aims to prevent safety hazards in lieu of testing or inspecting a final food product. HACCP provides a systematic and structured approach to hazard analysis and application of preventative measures.

Through the implementation of HACCP in a food service industry, the present inventor has seen a substantial reduction in food safety issues. Nevertheless, food allergies remain a severe threat.

What is needed in the art is an improved mechanism for protecting consumers from food allergies in food service environments.

SUMMARY OF THE INVENTION

It has now been surprisingly discovered that cross-contamination between food pans is a substantial source of food allergens in the food service industry.

The invention provides food pan fences, methods of using the food pan fences, and methods of manufacturing food pan fences.

A first aspect of the invention provides a food pan fence. The fence comprises at least two opposing walls (e.g. parallel walls). Optionally, the fence comprises one or more members configured to support and orient the at least two opposing walls ('support member'). Optionally, the one or more support members are provided between the at least two opposing walls, e.g. wherein the one or more support members comprise two parallel walls that form a rectangle with the at least two opposing walls.

In one embodiment, the fence comprises a plurality of walls configured to provide a barrier for a food pan. Optionally, the plurality of walls comprises a pair of lateral walls and a pair of longitudinal walls configured, e.g. as a rectangle. Optionally, at least one of the walls has a height that is shorter than one or more of the other walls. Optionally, the fence is an open-top fence. Optionally, the fence comprises an inner lip.

Optionally, the plurality of walls comprises a first wall, a second wall, a third wall, and a fourth wall arranged to form a food pan perimeter (e.g. rectangle), wherein:
  a. the first and third walls oppose each other and the second and fourth walls oppose each other;
  b. one or both of the first and third walls comprise at least a section of wall with a height that is less than the height of one or both of the second and fourth walls (a "low section"); and
  c. optionally, the one or both of the first and second walls has a length that is less than one or both of the second and fourth walls.

Optionally, one or both of the second and fourth walls have a height of less than about 6 in, for example, about 2 in to about 5 in (e.g. about 3 in).

Optionally, the low section has a height of about 1.5 in or less, for example, about ¼ in to about 1½ in (e.g. about ¾ in).

Optionally, the first and third walls comprise a length of at least about 12½ in, for example, about 12½ in to about 15 in, about 12½ in to about 14 in, or about 12¾ in to about 13 in (e.g. about 12⅞ in).

Optionally, the second and fourth walls comprise a length of at least about 18 in, for example, about 20 in to about 25 in, about 20 in to about 24 in, or about 20 in to about 22 in (e.g. about 21 in).

Optionally, the inner lip of the fence is configured to rest under the outer lip of a food pan. Optionally, the inner lip has a width of about ¼ in to about 1 in.

Optionally, the fence is configured to fit a food pan (e.g. a standard hotel pan), wherein the fence walls have lengths that are less than 20% longer than the walls of the food pan (e.g. less than 10% longer or about 5% or less longer).

Optionally, the fence comprises metal. Optionally, the metal comprises aluminum, steel (e.g. stainless steel), or copper. Optionally, the fence is made from sheet metal.

Optionally, the fence comprises blunt corners

A second aspect of the invention provides a method of using a fence of the invention (e.g. any fence taught herein). In one embodiment, the method comprises the steps of:
  a. providing at least one fence;
  b. providing at least one food pan; and
  c. positioning the at least one fence around the mouth of the at least one of food pan.

Optionally, the at least one fence comprises a plurality of fences and the at least one food pan comprises a plurality of food pans, wherein each fence is positioned around the mouth of a respective food pan. Optionally, at least one of the food pans contains a food allergen.

Optionally, the step of providing at least one food pan comprises providing a food bar comprising the at least one food pan (e.g. a food bar comprising a countertop 21 and cavity 22, as depicted in FIG. 3). Optionally, the food bar is a self-service food bar. Optionally, the step of providing a food bar comprises providing a cafeteria comprising the food bar. Optionally, the step of providing a cafeteria comprises providing a school cafeteria, an airport cafeteria, or a public-use cafeteria.

Optionally, the at least one food pan comprises food, and the method further comprises serving food from the food pan to at least one subject, whereby the fence prevents food spillage from the food pan. Optionally, the food contains an allergen. Optionally, the at least one subject is a child or a student (e.g. a primary school student, a secondary school student, or a K-12 student). Optionally, the at least one food pan comprises a first food pan and a second food pan, wherein the first food pan comprises a food allergen, and optionally, food from the second food pan is served to a subject with an allergy to the food allergen.

Optionally, the food pan comprises a food allergen and the method comprises preventing spillage of food from the pan.

A third aspect of the invention provides a method of manufacturing a fence of the invention.

In one embodiment, the method comprises forming walls configured to fit a food pan, e.g. after measuring dimensions (e.g. lateral and longitudinal dimensions) of the food pan.

Optionally, the step of forming walls comprises cutting a pattern from a sheet of metal and folding the pattern to form a fence of the invention. Optionally, the method comprises welding the fence to form continuous perimeter.

BRIEF DESCRIPTION OF THE DRAWINGS

FIGS. 1A-1G depict a fence of the invention. FIG. 1A depicts a perspective view. FIG. 1B depicts a top view. FIG. 1C depicts a side view. FIG. 1D depicts a front view. FIG. 1E depicts a perspective view. FIG. 1F depicts a detail view of a lip portion. FIG. 1G depicts a perspective cross-section view.

FIGS. 4A and 4B depict the top view and perspective view, respectively, of a food pan and fence according to the invention.

FIGS. 5A and 5B depict a fence in expanded form and collapsed form, respectively.

FIG. 8A is a front left perspective of the design. FIG. 8B is a top view thereof. FIG. 8C is a left side elevation view thereof.

FIG. 8D is front elevation view thereof. Optionally, the right side elevation view is the same as the left side elevation view, the rear elevation view is the same as the front elevation view, the front right perspective is the mirror image of the front left perspective, the rear right perspective is the same as the front left perspective, and/or, the rear left perspective is the same as the front right perspective. The rear wall is optionally unclaimed.

FIG. 9A is a front left perspective of the design. FIG. 9B is a top view thereof. FIG. 9C is a left side elevation view thereof. FIG. 9D is front elevation view thereof. Optionally, the right side elevation view is the same as the left side elevation view, the rear elevation view is the same as the front elevation view, the front right perspective is the mirror image of the front left perspective, the rear right perspective is the same as the front left perspective, and/or, the rear left perspective is the same as the front right perspective. The rear wall is optionally unclaimed.

DETAILED DESCRIPTION OF THE INVENTION

Figure 1A:
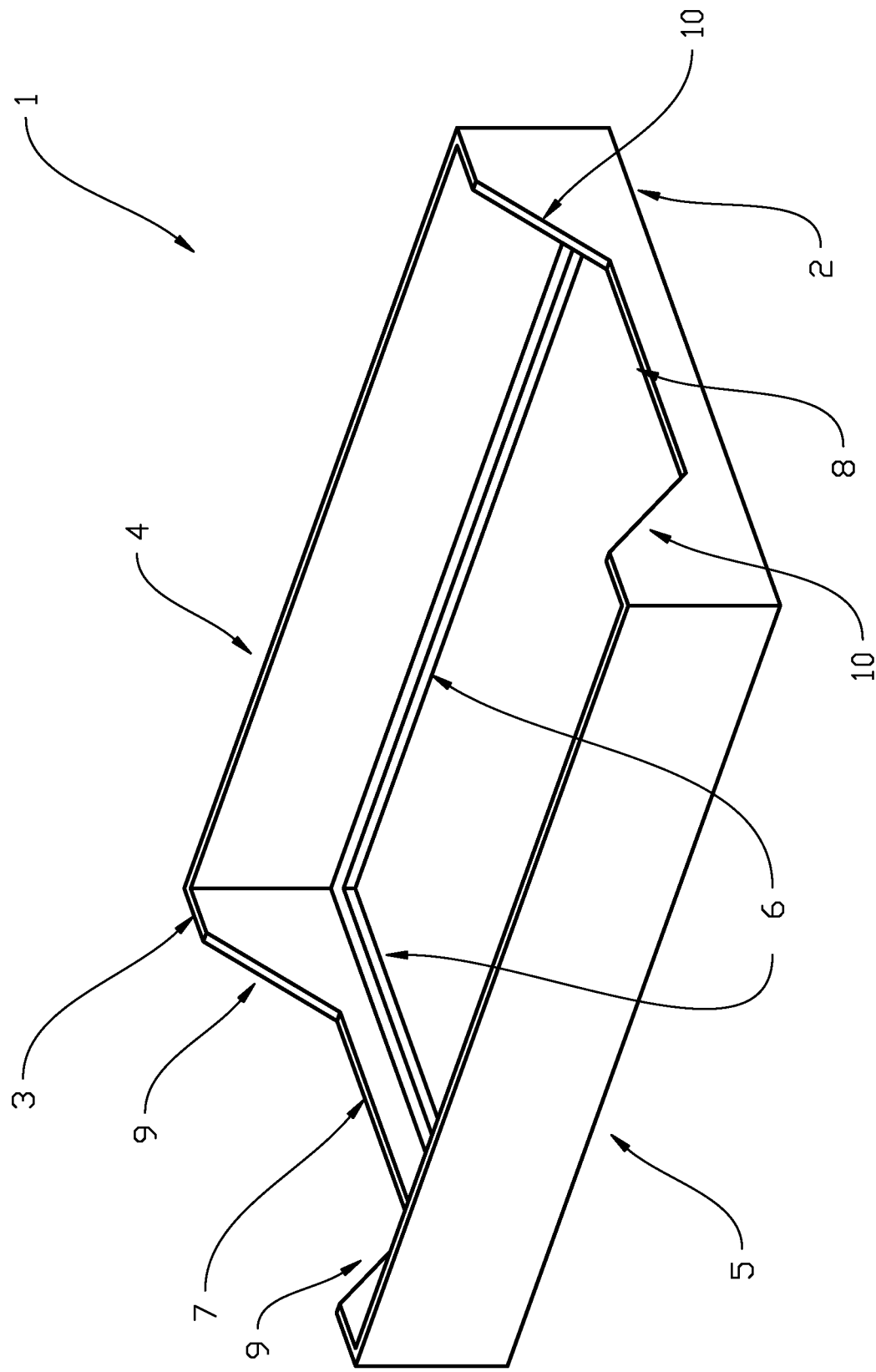

As used here, the following definitions and abbreviations apply.

"Exemplary" (or "e.g." or "by example") means a non-limiting example.

"Parallel walls" refers to at least two walls each having an edge wherein the edge of a first wall is parallel to the edge of a second wall. Optionally, the first wall has two edges (e.g. a top edge and a bottom edge) that are parallel to two edges of the second wall. Optionally, the first wall and the second wall each comprises a planar surface, wherein the planar surface of the first wall is parallel to the planar surface of the second wall. Optionally, a fence of the invention comprises parallel lateral walls and parallel longitudinal walls.

Walls

According to the present invention, a fence comprises a plurality walls.

Optionally, the fence comprises two opposing (e.g. parallel) sidewalls. Optionally, the fence further comprises one or more lateral walls, e.g. a front wall and/or a back wall, wherein the front wall and/or back wall comprises a low section Optionally, the plurality of walls comprises four walls arranged to form a food pan perimeter (e.g. a rectangle). For example, the plurality of walls can comprise a first, wall, a second, wall, a third wall, and a fourth wall, wherein a. the first and third walls are lateral walls (e.g. 'front' wall and 'back' walls) opposing each other and the second and fourth walls are longitudinal walls ('sidewalls') opposing each other;

b. one or both of the first and third walls comprise at least a section of wall with a height that is less than the height of one or both of the second and fourth walls (a "low section"); and c. optionally, the one or both of the first and second walls has a length Optionally, the fence is configured to fit a standard hotel food pan.

Sidewalls

A fence of the invention comprises at least two side walls (also referred to herein as 'longitudinal' walls).

Optionally, the fence is configured in any manner that, when combined with a food pan, provides the two sidewalls on opposing sides of the food pan.

Optionally, each of the sidewalls of the fence have a height that is substantially consistent along the length of the wall. For example, a sidewall wall with a substantially consistent height can have a height at the front edge that is within about 30% of the height of at the back edge. Not included in this embodiment are sidewalls that have a high front and a low back or vice versa.

Optionally, the sidewalls have a height of about 2 in to about 6 in. For example, the sidewalls can optionally have a height of about 2 in to about 5 in (e.g. about 3 in).

Optionally, the sidewalls have a length of at least 20 in. For example, the sidewalls can optionally have a length of about 20 in to about 25 in.

The sidewalls can be supported in any manner. For example, the sidewalls can be connected to each other by any structure that positions and supports the sidewalls, e.g. lateral walls (e.g. front and back walls) that combine with the sidewalls to form a rectangular frame (e.g. as depicted in FIG. 1). Alternatively, the sidewalls of the fence can be configured to attach to the sidewalls of a food pan or to a food bar surface, e.g. by a clip or magnet. Alternatively, the sidewalls can each comprise their own support structure (e.g. an "L" or "T" brace).

Lateral Walls

In one embodiment, a fence of the invention comprises sidewalls and at least one lateral wall, wherein the at least one lateral wall has at least a section of wall having a height less than that of the sidewalls ("low section"). Optionally, the fence comprises two lateral walls (e.g. a front wall and a back wall), wherein one or both of the lateral walls comprises a low section.

Optionally, the at least one lateral wall has at least one section of wall having a height greater than that of the low section ("high section"). Optionally, the lateral wall has two high sections separated by the low section. Optionally, the low section is centered between the high sections. Optionally, the low section is tapered from the high sections. Optionally, the taper is a straight taper (e.g. as depicted in FIG. 1), a curved taper, or a stepped taper. Optionally, the low section is less than half the height of the high section.

Optionally, the low section of the at least one lateral wall is less than half the height of the sidewalls.

Optionally, the at least one lateral wall has a length of at least 12 in, e.g. about at least about 12½ in, for example, about 12½ in to about 15 in, about 12½ in to about 14 in, or about 12¾ in to about 13 in (e.g. about 12⅞ in).

Open-Top

In one embodiment, a fence of the invention is an open-top fence.

According to the present invention, an open-top fence is any fence that does not have a fixed (non-removable) lid. Also not included in this embodiment are fences having a fence walls that meet to form a dome.

Optionally, the open top fence is configured for a food pan in any manner such that the fence does not substantially cover the mouth of the food pan when installed with the food pan. Additionally or alternatively, the open-top fence is configured in any manner that allows the fence to be installed with the food pan by elevating the food pan above the fence and lowering the food pan into the middle of the fence from above.

Such open-top fences can be provided in any manner. For example, by orienting the fence walls in a vertical manner, the fence walls do not extend inward. Alternatively, the fence walls can be tapered outwardly or even inwardly, e.g. without covering a substantial portion of the base area. With the teachings provided herein, the skilled artisan can now readily provide open-top fences with any wall orientation. For example, inwardly-tapered walls can be provided by tailoring the angle and/or height of the side walls, factors which govern the amount of base area covered by inwardly tapered walls.

Optionally, the fence comprises inwardly tapered walls and an inner lip at the wall base, wherein the walls do not extend past the inner edge of the lip.

Optionally, the open top-fence is any fence wherein the walls do not cover greater than 20% of the area (e.g. rectangular area in which a food pan can be placed) defined by the wall base ("base area"). Optionally, the walls do not cover greater than 10% of the base area. Optionally, the walls do not cover greater than 5% of the base area. Optionally, the walls do not cover greater than 5% of the base area.

An open-top fence can provide one or more superior advantages, e.g. the ease of accessibility (e.g. ability for a server to manipulate a serving utensil from above the middle of the fence) and/or an unobstructed view while offering sufficient protection via the side walls from cross-contact between food pans. Additionally, the configuration of a food pan fence with a lid will often utilize much taller side walls to allow users to manipulate a utensil under the lid. Accordingly, open-top fences can be provided with side walls of reduced height (e.g. heights disclosed herein) and can also provide one or more additional or alternative superior advantages such as reduced shipping volume and shipping expense, reduced storage volume, reduced construction materials and construction expense, reduced manufacturing steps, ability to manufacture from sheeting materials, reduced weight, enhanced manipulability, reduced washing burden for manual or automatic washing, reduced washing machine volume, ability to use opaque materials without impeding a user's vision of a food pan, Lip In one embodiment, a fence of the invention comprises an inner lip at the base of one or more walls of the fence. Optionally, the inner lip is configured in any manner such that, when installed with a food pan having an outer lip, the inner lip of the fence sits under the outer lip of the food pan. The one or more walls comprising a lip optionally comprise each of a pair of longitudinal walls, each of a pair of lateral walls, each of a pair of longitudinal walls and each of a pair of lateral walls, or each of a pair of longitudinal walls and one but not both of a pair of lateral walls.

Optionally, the inner lip has a width of less than about 2 in. For example, the inner lip can have a width of less than about 1 in, less than about ¾ in, or less than about ½ in, or about ¼ in to about 1 or 2 in.

Optionally, such a lip provides enhance stability and connectivity to the food pan, e.g. to inhibit movement of the fence when installed on a food pan. Optionally, the lip prevents removal (e.g. theft) of the fence when installed on a food pan, e.g. requiring the food pan to be removed concurrently from a cavity of a countertop.

Assembly

In one embodiment, the fence is an assembly of parts moveable with respect to each other from a disassembled orientation (e.g. collapsed, disconnected, or unfolded) to an assembled orientation. The assembled orientation is the orientation in which the assembly is configured to provide a functional food pan fence. The movable parts can be, e.g. walls and optionally inner lips.

Figure 7:
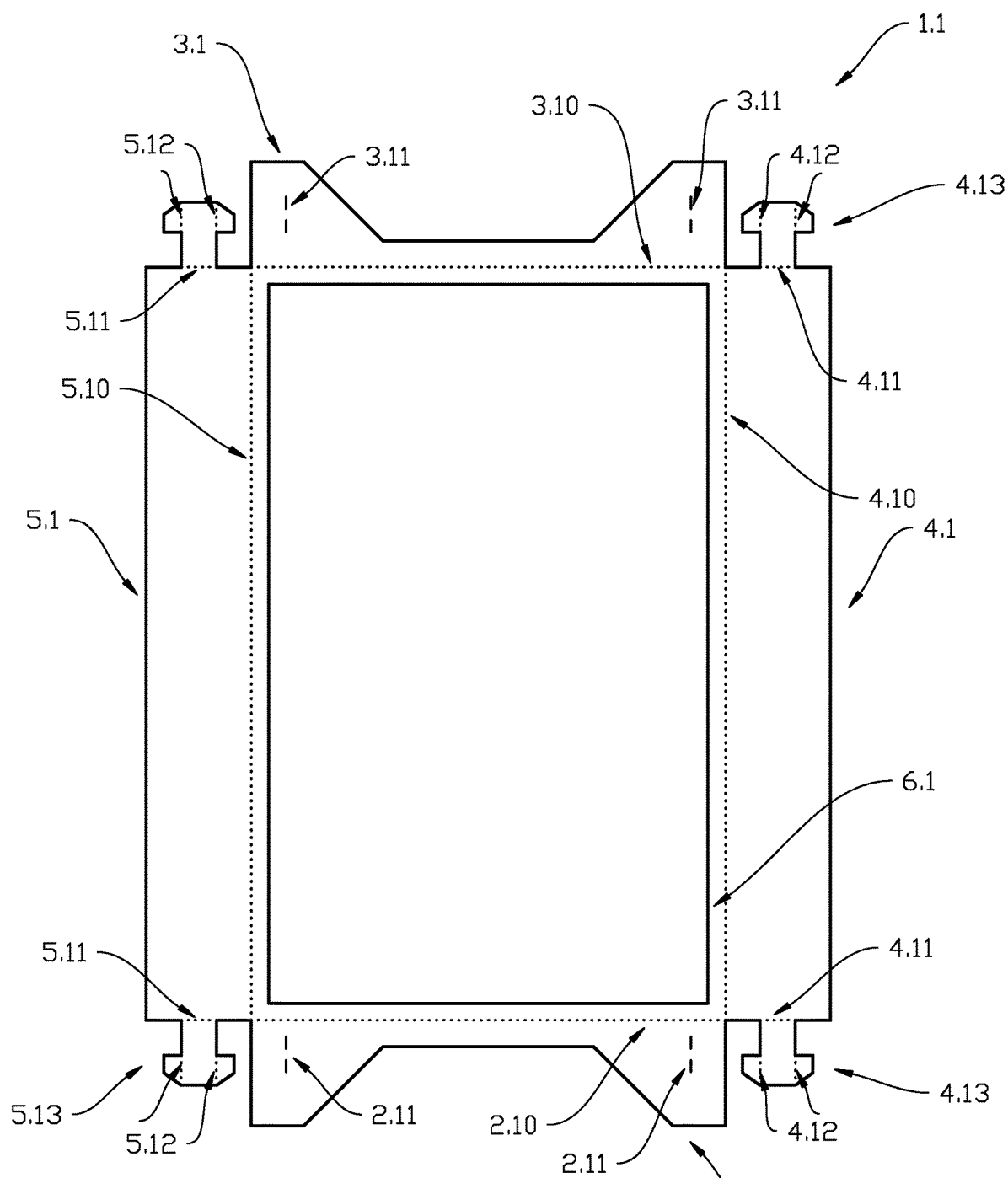
FIG. 7 depicts a fence of the invention.
Figure 8A:
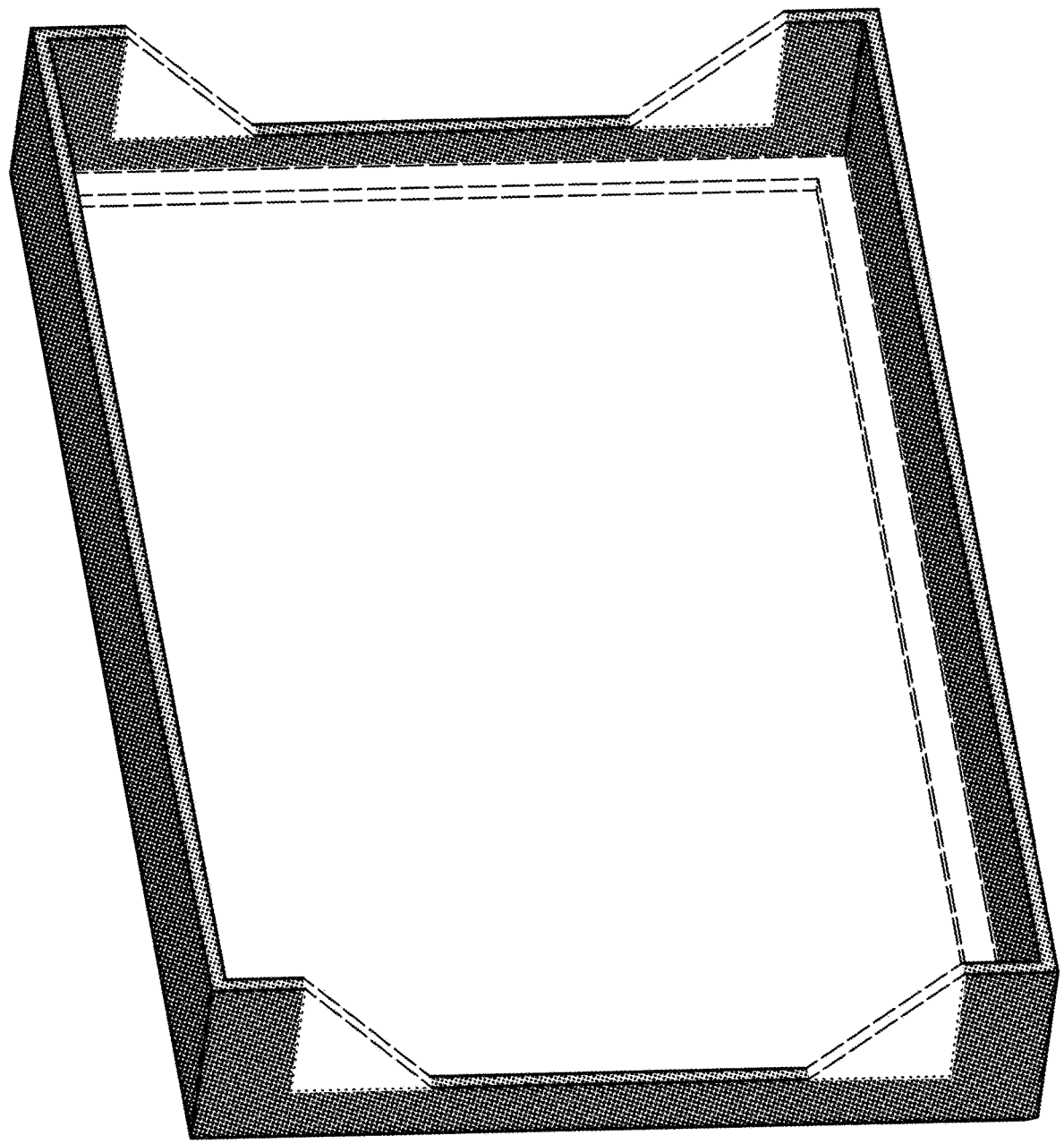
FIGS. 8A-8D depict views an ornamental design for a food pan fence. The dashed lines depict optionally unclaimed features of the design. The dotted lines depict boundaries of the claimed design. The stippling represents surface shading and not surface ornamentation. The unclaimed portions of the design (e.g. lip and/or tapered cutout portion) are optionally claimed.
Figure 8B:
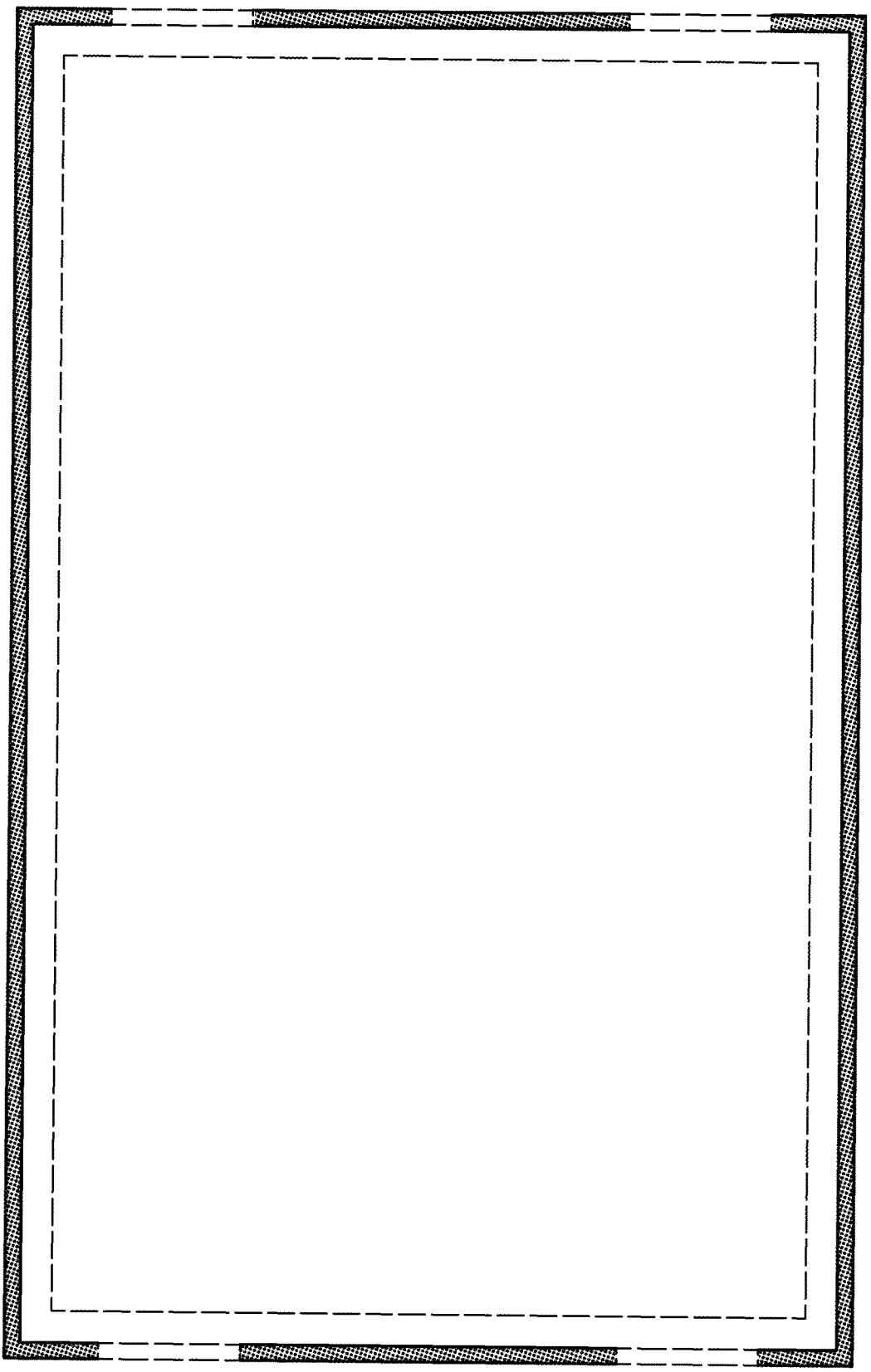
Figure 8C:
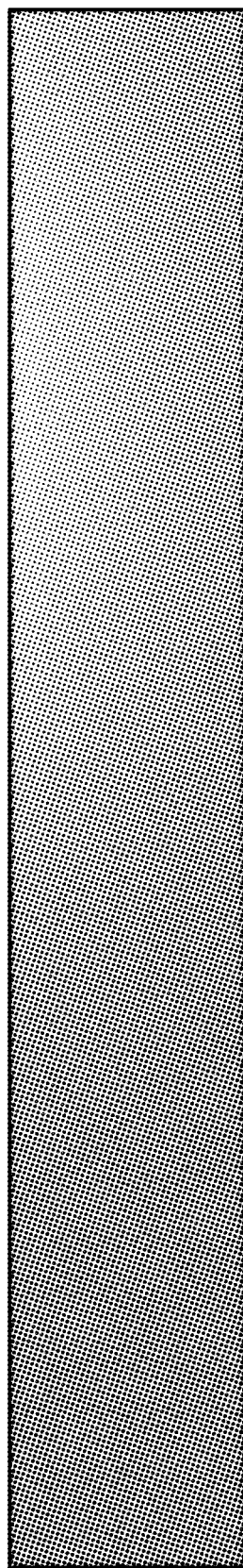
Figure 8D:
Figure 9A:
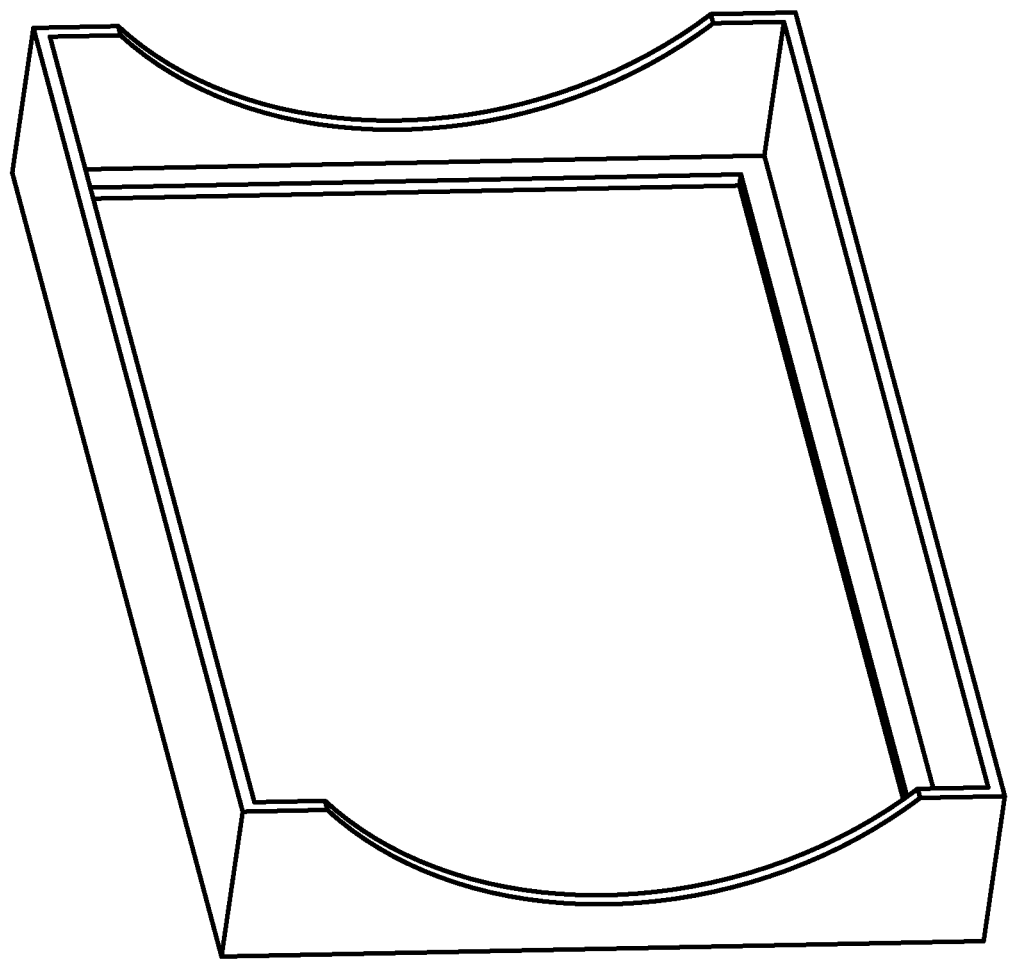
FIGS. 9A-9D depict views an ornamental design for a food pan fence. The design is the same as that shown in FIGS. 8A-8D except the cutout from the front wall and rear wall is curved. The lip is optionally unclaimed (e.g. as in FIGS. 8A-8D).
Figure 9B:
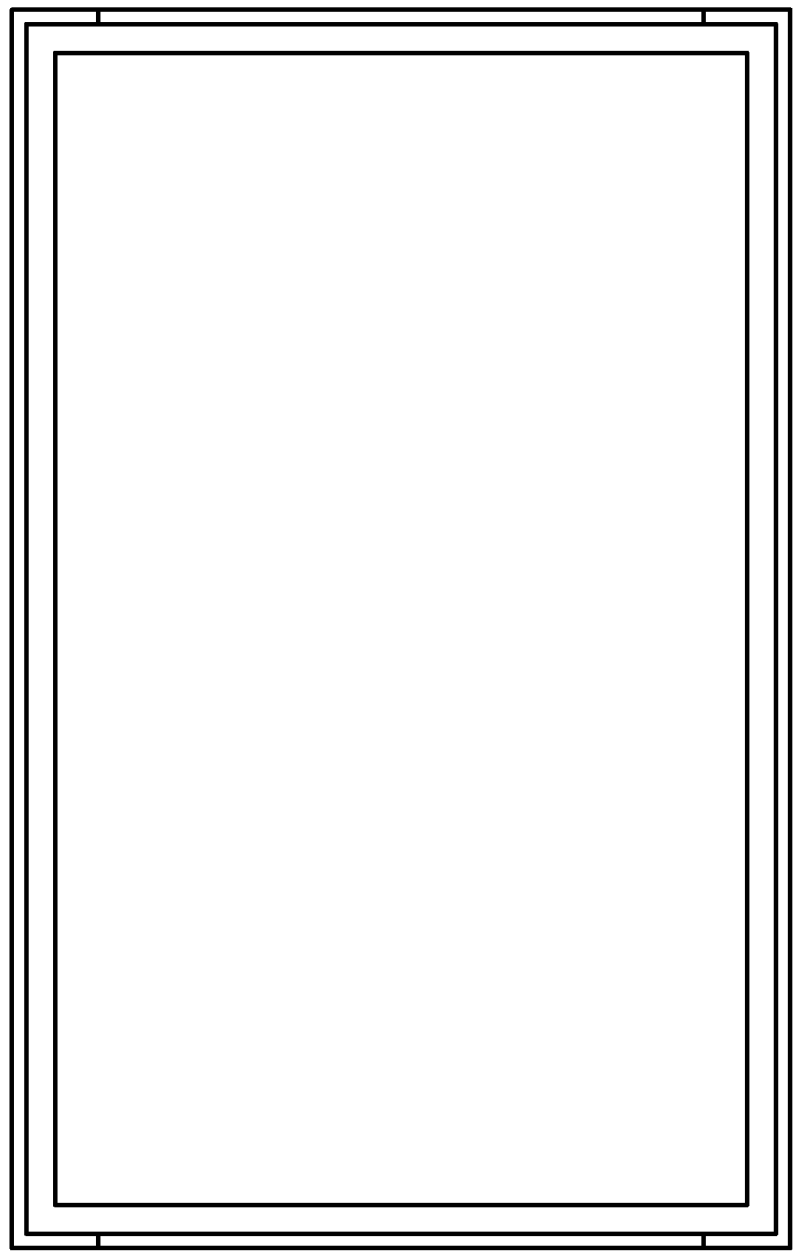
Figure 9C:
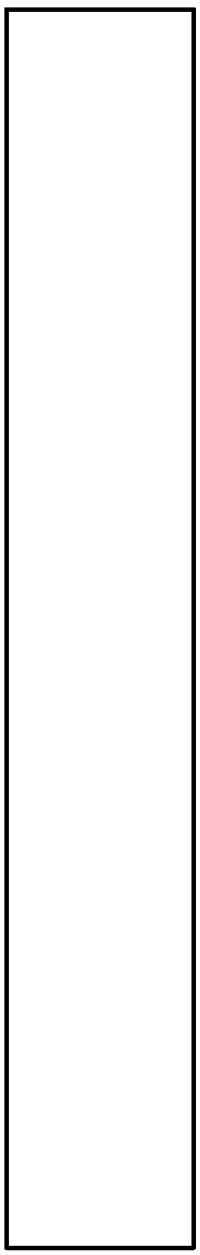
Figure 9D:
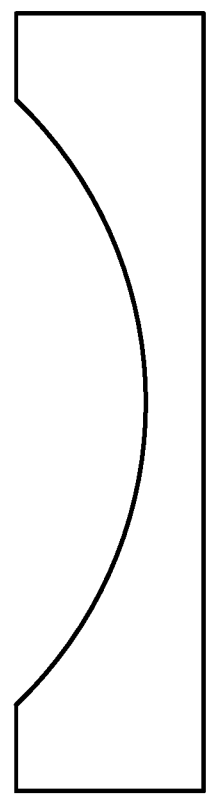

Optionally, the assembly comprises one or more) hinges. Optionally, the assembly comprises one or more hinges connecting adjacent walls (e.g. as depicted in FIG. 5) and/or one more hinges connecting one or more wall to a respective lip(s). The disassembled orientation can be, e.g. a folded orientation or other collapsed orientation. Optionally, the collapsed orientation is any orientation that has at least one dimension that is shorter than that of the assembled orientation. Optionally, the assembly is made from plastic or paper (e.g. card-stock, cardboard, or any cellulosic, natural, or synthetic paper). Optionally, the hinges are barrel hinges (e.g. as depicted in FIG. 5) or pleats (e.g. a bendable segment of material such as a thin segment of plastic or a fold line such as a paper fold line as depicted in FIG. 7). Optionally, the assembly fence comprises an inner lip, e.g. fixed or hinged to one or more walls. An example of a hinged inner lip is depicted in FIG. 7 (e.g. fold line 5.10 connecting lip 6.1 and wall 5.1).

Optionally, the assembly comprises one or more fasteners. Optionally, the fasters are any fasteners comprising interacting couplers, wherein each coupler is attached to a respective part. Examples of useful fasteners include snap-together fasters, slide-together fasteners, or push together fasteners. Examples of such are known in the art, e.g clips, clasp, tab and slot faster, a button, tongue and groove fasters, male/female fastener, key/keyway fasteners. Optionally, the fastener is a reversible fastener, e.g. it is capable of being unfastened with ease by a user and/or without damage to the fastener or fence. Example of useful fasteners are depicted in FIG. 6 (e.g. parts 5.21 and 2.21) and FIG. 7 (e.g. parts 4.12 and 3.11).

Optionally, the disassembled orientation of the assembly is a collapsed orientation e.g. as depicted in FIG. 5B or FIG. 7. Optionally, the collapsed orientation is an unfolded orientation such as a fully unfolded orientation (e.g. as depicted in FIG. 7) or a partially unfolded orientation (e.g. as depicted in FIG. 5B).

Figure 6:
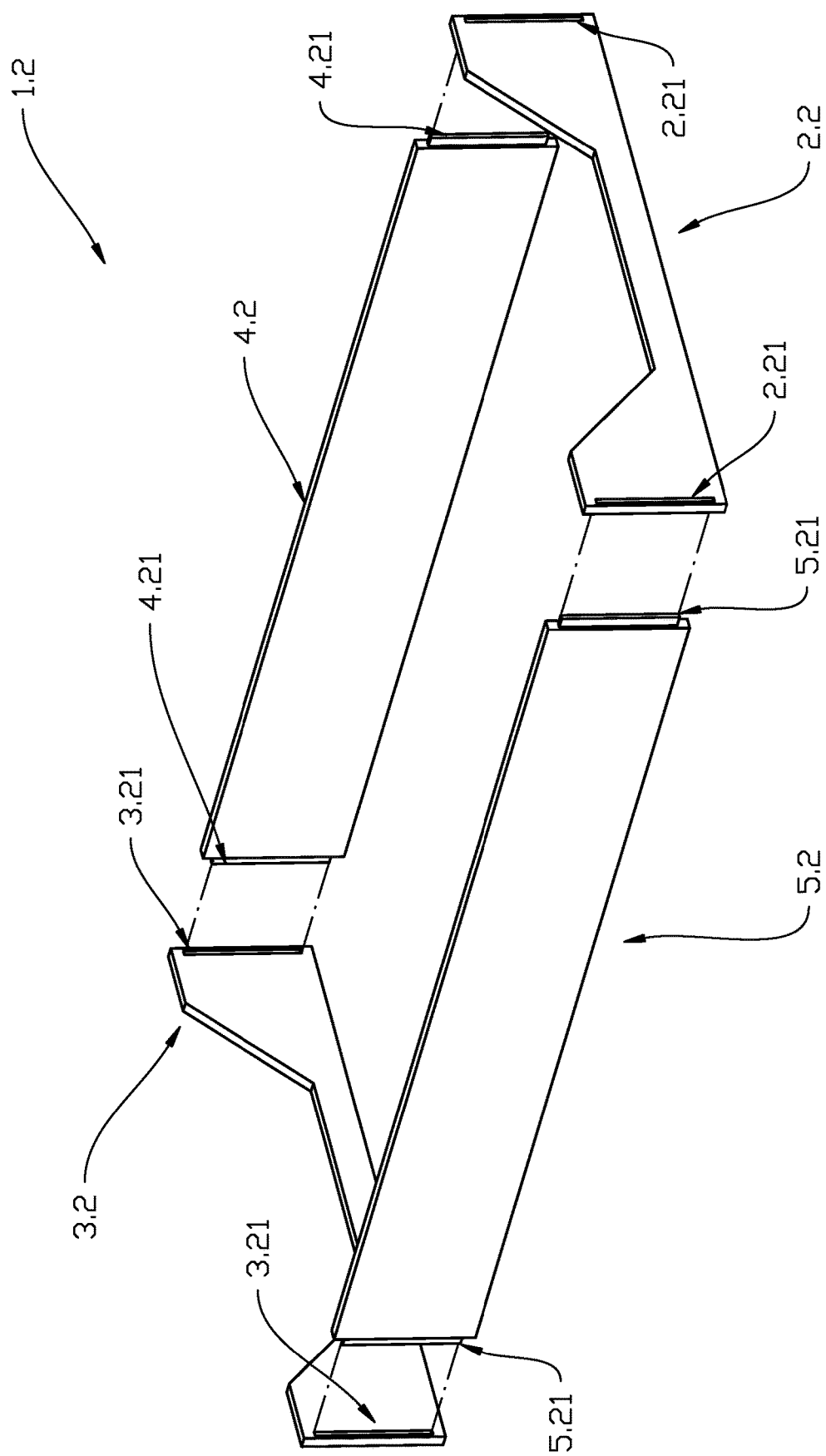
FIG. 6 depicts a fence of the invention.

Optionally, the disassembled orientation of the assembly is a disconnected orientation, e.g. as depicted in FIG. 6.

Assembly Kits

One embodiment of the invention provides a first fence comprising an assembly of four walls (a pair of lateral walls and a pair of longitudinal walls) that can be connected and disconnected from each other to assemble and disassemble the fence, e.g. as depicted in FIG. 6. According to the invention, a kit is optionally provided comprising the four walls, and further comprising a fifth wall and a sixth wall that can replace either the pair of lateral walls or the pair of longitudinal walls to form a second fence with dimensions that are different than the first fence. Accordingly, the fifth and sixth walls have substantially the same length as each other and a different length than the pair of walls that they are configured to replace. Optionally, the fifth and sixth walls have the same coupler or fastener as is present on the pair of walls that they are configured to replace.

Optionally, the fifth and sixth walls have substantially the same height as the pair of walls that they are configured to replace, but a different length.

Optionally, the fifth and sixth walls have are lateral walls (i.e. configured to replace the lateral walls of the first fence) and comprise a plurality of sections of wall, wherein: the plurality of sections comprises a first section and a second section, the first section has a height that is less than the second section; and optionally, the plurality of sections comprises a third section, wherein the first section is between the second section and the third section, and the height of the third section is greater than the height of the first.

Optionally, the kit comprises a seventh wall and an eighth wall that can replace either the pair of lateral walls or the pair of longitudinal walls to form a third fence with dimensions that are different than the first fence and the second fence. Accordingly, the seventh and eighth walls have substantially the same length as each other and a different length than the pair of walls that they are configured to replace. Optionally, the seventh and eighth walls have the same coupler or fastener as is present on the pair of walls that they are configured to replace.

Optionally, the seventh and eighth walls have substantially the same height as the pair of walls that they are configured to replace, but a different length.

Optionally, the seventh and eighth walls have are lateral walls (i.e. configured to replace the lateral walls of the first fence) and comprise a plurality of sections of wall, wherein: the plurality of sections comprises a first section and a second section, the first section has a height that is less than the second section; and optionally, the plurality of sections comprises a third section, wherein the first section is between the second section and the third section, and the height of the third section is greater than the height of the first.

One embodiment of the invention provides a kit comprising a first pair of lateral walls and a first pair of longitudinal walls, wherein one or both of the first pair of lateral walls has a height that is less than the height of the first pair of longitudinal walls, wherein each of the first pair of lateral walls comprises at each side edge a coupler of a first type and each of the first pair of longitudinal walls comprises at each side edge a coupler of a second type, wherein the couplers of the first type are configured for interacting with the couplers of the second type to connect the pair of lateral walls to the pair of longitudinal walls (e.g. as depicted in FIG. 6), and the kit further comprise a second pair of lateral walls and/or a second pair of longitudinal walls, wherein each of the second pair of lateral walls comprises at each side edge a coupler of the first type and each of the second pair of longitudinal walls comprises at each side edge a coupler of the second type. The first pair of lateral walls has a different length than the second pair of lateral walls. Similarly the first pair of longitudinal walls has a different length than the second pair of longitudinal walls. In this embodiment, the kit is configured for alternatively assembling first and second fences of different dimensions.

Kits of the invention have many advantages. In addition to providing a fence that can be disconnected into individual walls for storage, the user can combine different pairs of walls to form different fences at will. For example, the user can appropriately select lateral and longitudinal walls to alternatively assemble a first fence and a second fence. The first fence and second fence can share a dimension (i.e. the first and second fence have in common either a pair of lateral walls or a pair of longitudinal walls) or can have two different dimensions (i.e. the first and second fence do not have any walls in common). By example, the first fence and second fence can configured for Pan A and Pan B, respectively, or Pan A and Pan C, respectively, or Pan D and Pan E respectively, or Pan E and Pan F, respectively. In configuring a fence for a pan, the skilled artisan will recognize that, if the pan has an outer lip, the walls of the fence must be at least the length of the respective outer lip dimension.

Optionally, at least one of the pairs of walls comprises an inner lip. Optionally, the kit comprises a first pair of walls that is substantially the same as a second pair of walls, except that the first pair of walls comprises an inner lip and the second pair does not comprise an inner lip. This embodiment allows, e.g. a user to provide two fences with the same lateral and longitudinal dimensions, but one fence with an inner lip and one fence without.

Optionally, the kit comprises a first pair of walls that is substantially the same as a second pair of walls, except that the first pair of walls and the second pair of walls have different heights. This embodiment allows, e.g. the user to provide two fences with the same lateral and longitudinal dimensions, but with the fences having different wall heights.

Dimensions

A fence of the invention can be configured with any dimensions.

Optionally, the fence is configured for a standard hotel food pan. Standard hotel food pans are well known in the art, used in many food service establishments (e.g. schools, restaurants, caterers, hotels, events, and parties), and have a pan with wall dimensions (measured from the outer surface of the walls) of about 12 in×20 in and an outer lip with dimensions of about 12¾ in×20¾ in. Optionally, a fence configured for a standard hotel food pan comprises sidewalls with a length of at least about 20¾ in (e.g. about 21 in, measured from the inside of the fence). Optionally, the fence further comprises one or more lateral walls (e.g. front and back walls) having a length at least about 12¾ in. Optionally, the fence further comprises an inner lip at the base of the side walls, wherein the distance between the inner edges of the inner lips is at least 12 in and less than or equal to 12¾ in. Optionally, the fence comprises lateral walls and an inner lip at the base of the lateral walls, wherein the distance between the inner edges of the inner lips is at least 20 in and less than or equal to about 20¾ in. Accordingly, a fence of the invention can be configured to provide a perimeter around a hotel food pan.

Optionally, the length of the lateral walls (dimension F1 in FIG. 4A) is less than the length of the longitudinal walls (dimension F2 in FIG. 4A). Optionally, the ratio of F2:F1 is from about 4:1 to about 2:1 or about 3:2 to about 2:1, or about 7:6 to about 11:6. Such lengths correspond to many known food pans.

Optionally, the fence is configured for any of the food pans listed in Table 1. Optionally, the fence comprises walls with dimensions that are at least that of (e.g. and less than 20%, 10%, or 5% greater than) the outer lip dimensions of the food pan (i.e. P1×P2, as depicted in FIG. 4B). Optionally, the fence comprises an inner lip with dimensions (i.e. F3 and/or F4 as depicted in FIG. 4b) that are at least that of the wall dimensions of the food pan (i.e. P3 and/or P4, as depicted in FIG. 4b) and less than the outer lip dimensions of the food pan (i.e. P1 and/or P2, as depicted in FIG. 4B). As one example, a fence configured for pan A optionally comprises: longitudinal walls with a length (measured from the inside base of the walls, or F2 in FIG. 4A) of 21 in to 21+10% in (i.e. 21 in to 23.1 in), lateral walls with a length (F1 in FIG. 4A) of 12⅞ in to 12⅞+10% in, and one or both of a) an inner lip on each of the longitudinal walls spaced apart by 11⅞ in to 12⅞ in; and b) an inner lip on each of the lateral walls spaced apart by 20 in to 21 in.

TABLE 1

Food Pans

| Pan | Outer Lip Dimensions (in) | Wall Dimensions (in) |
|---|---|---|
| A | 21 × 12⅞ | 20 × 11⅞ |
| B | 21 × 6⅜ | 20 × 5⅜ |
| C | 12⅞ × 10⅞ | 11⅞ × 9⅜ |
| D | 10⅜ × 6⅜ | 9⅜ × 5⅜ |
| E | 7 × 6⅜ | 6 × 5⅜ |
| F | 7 × 4⅛ | 6 × 3⅛ |

Corners

In one embodiment, the fence has blunt corners. For example, the fence can comprise rounded corners. Optionally, the fence comprises blunt inner corners and/or blunt outer corners.

Blunt (e.g. rounded) outer corners provide a safety measure to prevent accidental injury if a user's hand is forcibly hit on the outer corner.

Blunt (e.g. rounded) inner corners prevent food from becoming trapped and/or less accessible to a cleaning utensil when optionally sanitizing the fence for reuse.

Optionally, blunt outer corners are provided by polishing, sanding, or any other mechanical process of dulling.

Optionally, blunt inner corners are provided by bending (e.g. to a variable radius) and/or welding to a lip Materials Fences of the invention can be made of any material.

Optionally, the fence is made of synthetic or natural materials.

Optionally, the fence is made from a rigid material.

Optionally, the fence comprises (or "is made from") a metal or a plastic, e.g. a food-grade metal or plastic.

Optionally, the fence is made from a metal selected from: steel, aluminum, copper, and tin. Optionally, the fence is made from stainless steel.

Optionally, the fence is made from a plastic selected from a polyalkylene (e.g. polypropylene, polyethylene, HDPE, LDPE), a PVC, a nylon, and a polycarbonate.

Optionally, the fence is made from sheet metal.

Optionally, the fence is made from a material selected from glass, wood, metal, plastic, and formica.

Optionally, the fence does not comprise glass or brittle plastic.

Methods of Use

In one embodiment, a fence of the invention is used. Optionally, the fence is used in a food service environment, e.g. a self-service or server-based cafeteria or other food service establishment.

In one embodiment, the method comprises the steps of:
a. providing at least one fence;
b. providing at least one food pan; and
c. positioning the at least one fence around the mouth of the at least one of food pan.

Optionally, the at least one fence comprises a plurality of fences and the at least one food pan comprises a plurality of food pans, wherein each fence is positioned around the mouth of a respective food pan. Optionally, at least one of the food pans contains a food allergen.

Optionally, the step of positioning comprises elevating the food pan above the fence and lowering the food pan into the middle of the fence from above.

Optionally, the step of providing at least one food pan comprises providing a food bar comprising the at least one food pan. Optionally, the food bar is a self-service food bar. Optionally, the step of providing a food bar comprises providing a cafeteria comprising the food bar. Optionally, the step of providing a cafeteria comprises providing a school cafeteria, an airport cafeteria, or a public-use cafeteria.

Optionally, the at least one food pan comprises food, and the method further comprises serving food from the food pan to at least one subject, whereby the fence prevents food spillage from the food pan. Optionally, the food contains an allergen. Optionally, the at least one subject is a child or a student (e.g. K-12 student). Optionally, the at least one food pan comprises a first food pan and a second food pan, wherein the first food pan comprises a food allergen, and optionally, food from the second food pan is served to a subject with an allergy to the food allergen.

Optionally, the food pan comprises a food allergen and the method comprises preventing spillage of food from the pan.

EXAMPLES

Example 1 Fence

FIGS. 1A-1G depict a fence 1 according to the invention. The fence 1 comprises a plurality of walls arranged to provide a perimeter around an optional food pan 11 (e.g. as depicted in FIG. 2B). Optionally, the base of the food pan is inserted into a cavity 22 of a countertop 21. Specifically, the fence comprises lateral walls 2,3 and longitudinal walls 4,5 arranged to form a rectangle.

Low sections 7,8 are provided in the middle of the lateral walls 2,3. The low sections 7,8 are configured to be lower in height than the longitudinal walls 4,5. For example, the low sections 7.8 can have a height of about ¾ in and longitudinal walls 4,5 can have a height of about 3 in. Optionally, the lateral walls 2,3 comprise high sections (relative to the low sections), and optionally, the high sections are separated from the low sections 7,8 by tapers 9,10. Such low sections 7,8 provide a mechanical guide to a serving utensil and a visual guide to the server, thereby ensuring that that the serving utensil and any contained food stay substantially centered between the longitudinal walls when dishing food from a food pan out through the low sections 7,8.

Figure 1F:
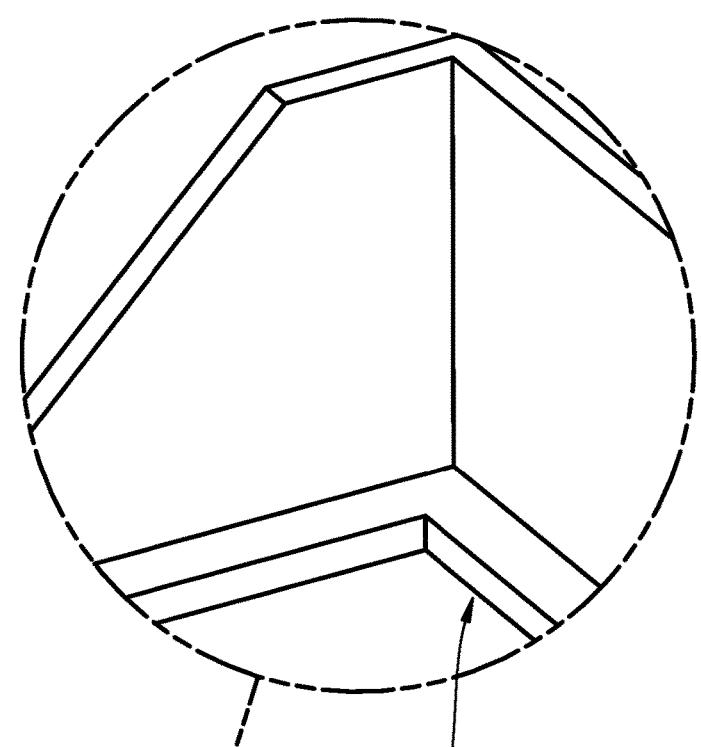
Figure 1E:
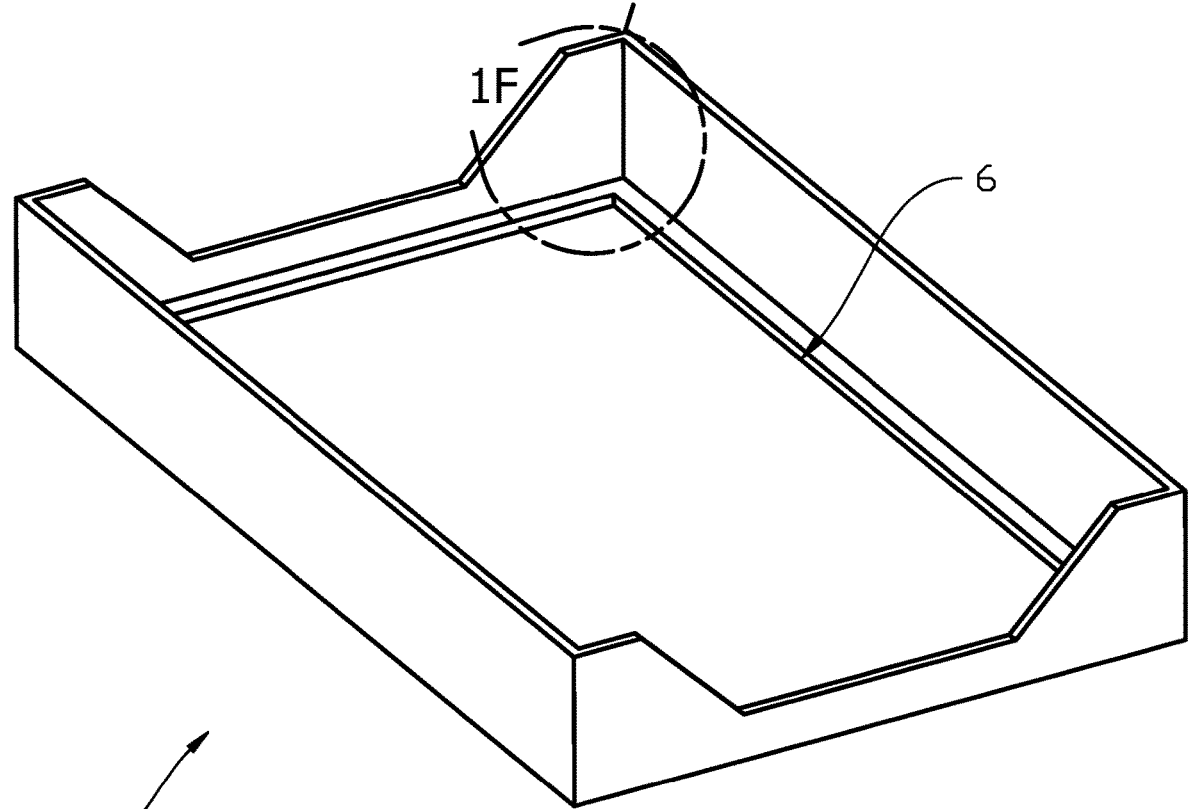
Figure 1G:
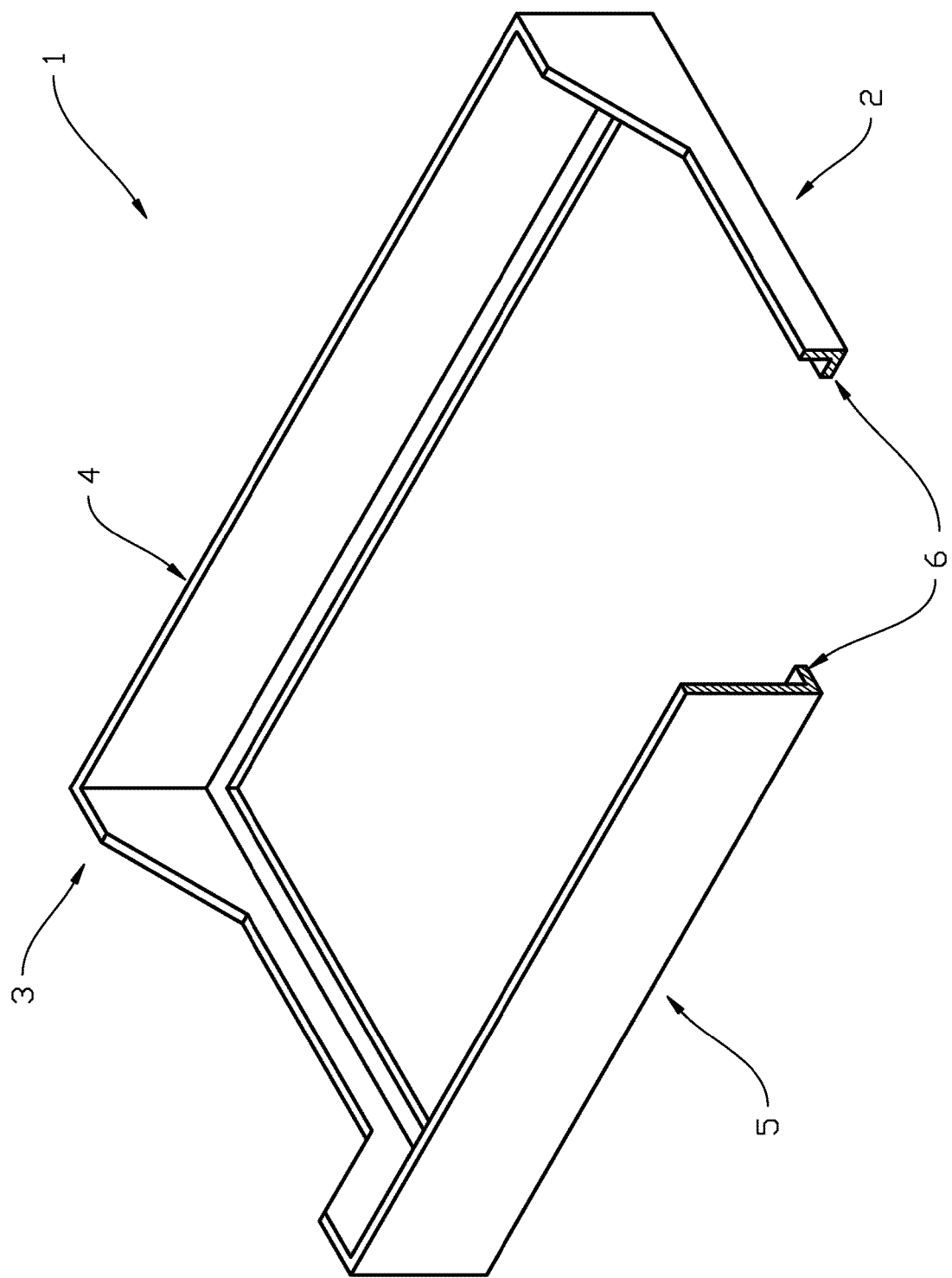
Figure 2A:
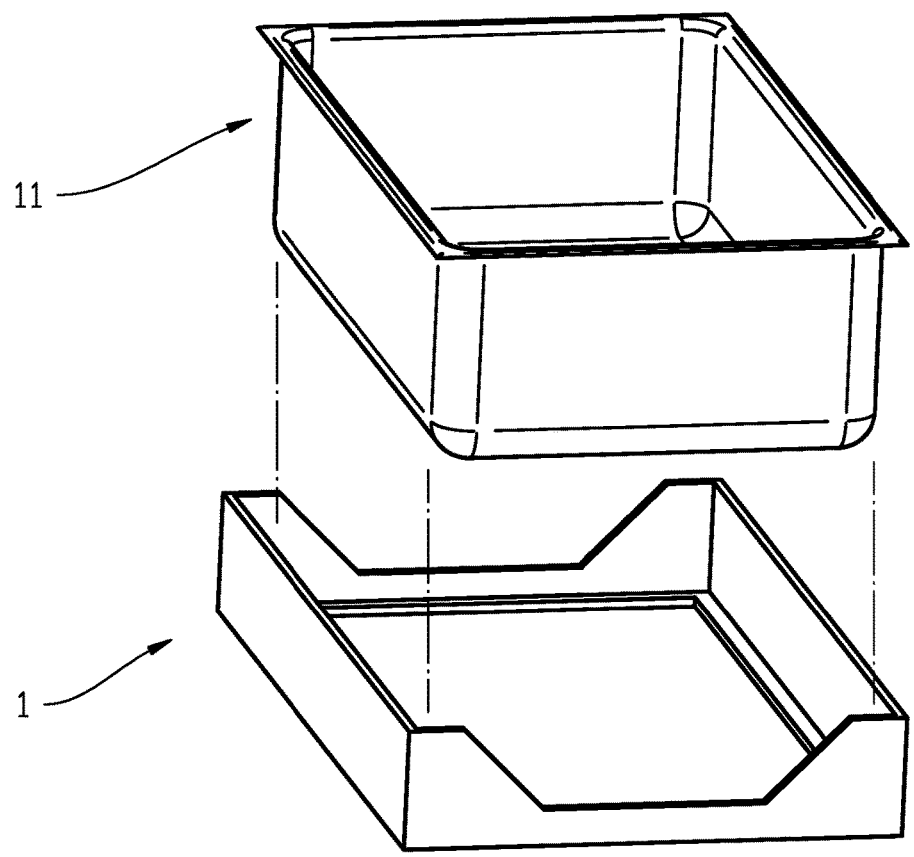
FIGS. 2A and 2B depict a fence and food pan in an exploded view and normal view, respectively.
Figure 2B:
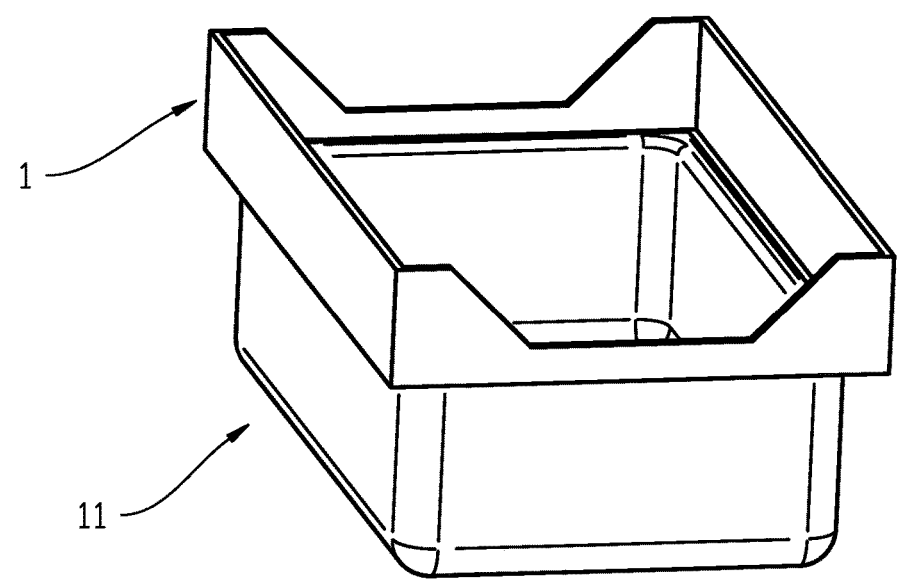
Figure 3B:
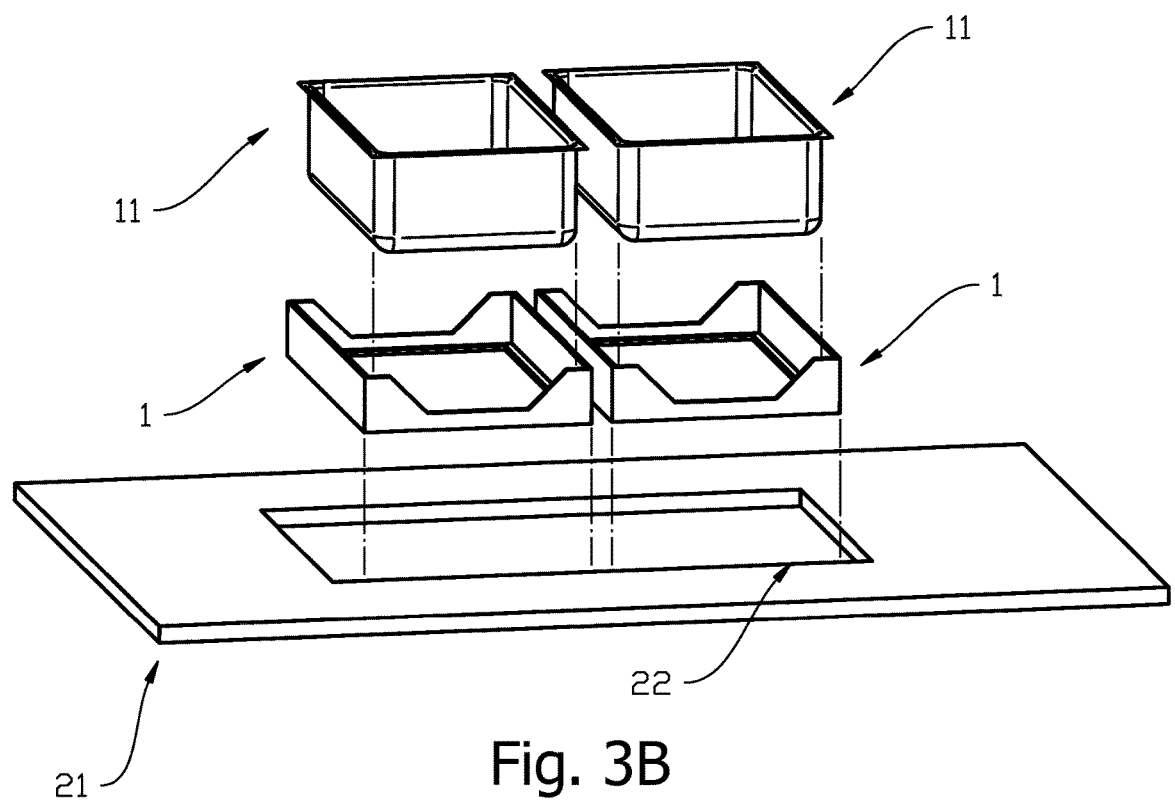
FIGS. 3A and 3B depict a food bar with a fence of the invention in a normal view and exploded view, respectively.
Figure 3A:
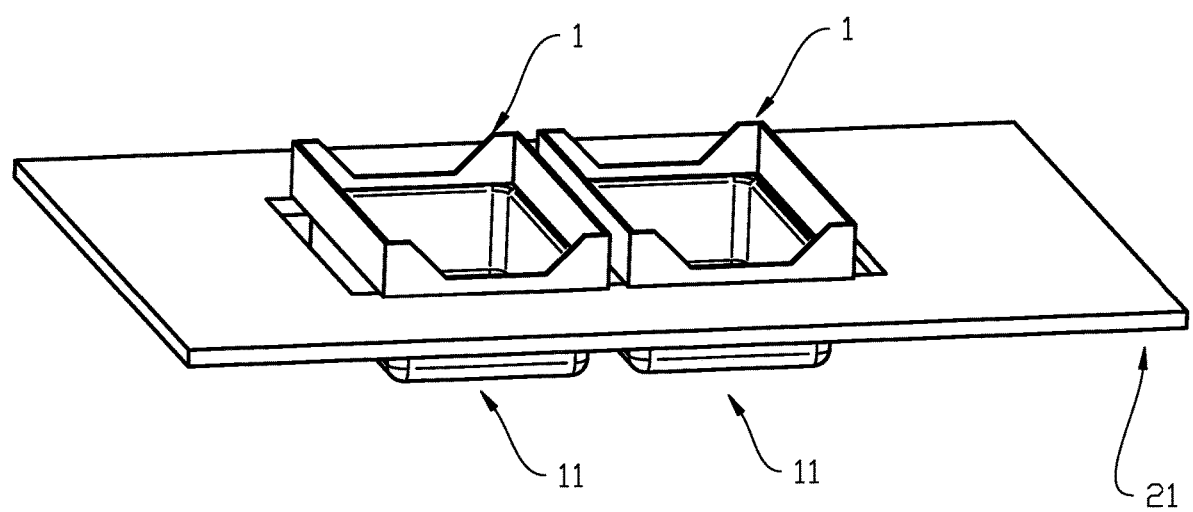

The fence 1 further comprises an inner lip 6 at the base of the walls, as depicted in FIGS. 1A, 1G, and 1F. The lip 6 can be provided around the entire perimeter (on all walls) or can be provided on less than all walls (e.g. an inner lip provided on two opposing walls). The inner lip 6 is configured to sit under the outer lip of a food pan 11, e.g. as depicted in FIG. 2. To achieve this, the inner lip 6 is sized to provide a mouth that is smaller than the perimeter of the outer lip of a food pan. For example, as depicted in FIG. 4, the inner lip 6 is sized to provide a mouth having dimensions (F3×F4) which are less than the dimensions (P1×P2) of the perimeter formed by the outer lip of a food pan and greater than the outer perimeter of the food pan walls (P3×P4).

The lengths of the fence walls are configured to provide a perimeter around a food pan. For example, as depicted in FIG. 4, fence walls have lengths (F1×F2, measured from the inside of the fence) that are greater than the perimeter edges (e.g. outer lip) of the food pan (P1×P2). Optionally, the lengths of F1 and F2 are less than 20% greater (e.g. about 10% or less or about 5% or less) than the lengths of P1 and P2 respectively.

Example 2 Experiment

Regardless of all of the HACCP controls observed in food purchasing and production controls, it is still possible for allergens to be a hazard in the manner in which the foods that contain them are offered to the customer in the service process.

The invention described within is, in part, due to surprising discoveries made by the inventor and manner in which discovered problems can be solved. Specifically, the inventor observed a self-service food bar serving 3000 children daily in the style of Cafeteria or Buffet (a style of service common in a high percentage of high volume institutional settings). Although the food service establishment followed HACCP standards, it was surprisingly discovered that foods with allergens in their makeup, though strictly controlled throughout the production processes and carefully labeled on the cafeteria line as to the particular allergen contained within, once placed on the cafeteria line, were accidently comingled by the customers with adjacent foods that contained no warning, e.g. while dishing out egg salad, some egg (an allergen) spilled into the adjacent tuna salad said to be allergen-free. This is comingling or cross-contamination is also known as "cross contact".

Various methods were employed to correct the problem, but none were found to be fully effective in reducing the problem.

Specifically, various styles of a single-walled straight fence were positioned to stand upright between the pan with and the pan without an allergen. Clear plastic pan covers that folded open in the center to allow the client access to the food pan containing the allergen, or to the food pan not containing the allergen.

Results included difficulty in keeping the individual straight fence upright during the service procedure and in keeping the clear plastic folding lid from being left open by the client thus negating any benefit to encourage care in the self-service procedure. Both methods failed to effectively mitigate cross contact between the pan of food containing the allergen and the pan of food without the allergen. Neither attempt was as successful as the 4-sided fence with the lower front that seemed to guide the clients serving utensil while catching food particles from being accidentally spilled over the sides into the neighboring pan of food.

Contrary to the above failures, a fence of the invention provides superior protection from cross-contact.

Example 3 Assembly Fence

In one embodiment, the invention provides an assembly fence comprising walls movable with respect to each other. An example is depicted in FIGS. 5A and 5B which illustrate an assembled orientation and disassembled orientation, respectively. The assembly comprises lateral walls 2.3, 3.3 connected to longitudinal walls 4.3, 5.3 by hinges (e.g. plunge and barrel hinges) 34, 42, 35, and 53. When not in use, the assembly can be disassembled or collapsed to the orientation depicted in FIG. 5B. The assembly can be pivoted about the hinges from the assembled orientation to the disassembled orientation. For example, as depicted in FIG. 5, walls 1.3 and 5.3 can be unfolded about hinge 35 and walls 4.3 and 2.3 can be unfolded about hinge 42. This causes walls 4.3 and 1.3 to come closer together and walls 2.3 and 5.3 to come closer together, thereby reducing the lateral dimension.

The walls are optimally made of plastic, metal, or paper.

The hinges are optionally plunger and barrel hinges (e.g. metal) or pleated hinges (e.g. a thin segment of the same material comprised by the walls).

Optionally, the assembly comprises an inner lip (not shown). Optionally, the assembly comprises an inner lip on each of any two opposing walls. Optionally, the inner lip(s) is attached to respective walls by a hinge or is fixed (e.g. molded) to the respective wall.

Such a collapsible assembly can be used. e.g. to provide a fence having a smaller footprint for storage.

Example 4 Assembly Fence

In one embodiment, the invention provides an assembly fence comprising walls movable with respect to each other. An example is depicted in FIG. 6. The assembly comprises lateral walls 2.2, 3.2 connected to longitudinal walls 4.2, 5.2 by fasteners. Specifically, the fasters comprise four pairs of interacting couplers, wherein one of the interacting couplers of each pair is on a lateral wall and one is on an adjacent longitudinal wall. For example, longitudinal walls 4.2 and 5.2 comprise keys 4.21 and 5.21, respectively, and lateral walls 2.2 and 3.2 comprise keyways 2.21 and 3.21 respectively. The keys are configured to interact with the keyholes, e.g. by snapping-together. When not in use, the assembly can disconnected, e.g. and stacked together for storage with a small footprint.

The walls are optimally made of plastic, metal, or paper.

Optionally, the assembly comprises an inner lip (not shown). Optionally, the assembly comprises an inner lip on each of any two opposing walls.

Such a collapsible assembly can be used. e.g. to provide a fence having a smaller footprint for storage.

Example 5 Assembly Fence

In one embodiment, the invention provides an assembly fence comprising walls movable with respect to each other. The assembly can provided in both a disassembled orientation, e.g. as depicted in FIG. 7 and an assembled orientation e.g. as depicted in FIGS. 1A-1G. Referring to FIG. 7, the disassembled orientation is an unfolded orientation comprising pleats (e.g. fold lines 3.10, 4.10, 2.10, 5.10) connecting the walls 2.1, 3.1, 4.1, 5.1 to respective portions of the circumferential inner lip 6.1. The assembly is configured such that the walls can be folded up into position where fasteners formed by interacting couplers can be fastened together to form a functional fence. The fasteners can comprise, e.g. tabs (e.g. tabs 5.13 and 4.13 with pleats 5.11, 5.12, 4.11, and 4.12) and slots (e.g. slot 2.11) as couplers on adjacent walls. The slots in FIG. 7, are depicted as dashed lines and the pleats are depicted by dotted lines. Optionally, the tabs comprise ears (e.g. ears 5.11) capable of expanding (e.g. unfolding) to secure the interacting couplers into a position that provides a functional fence.

Such a collapsible assembly can be used. e.g. to provide a fence having a smaller footprint for shipping and/or storage. Optionally, the assembly can be provided in a disassembled orientation that is completely unfolded and/or flat (e.g. a flat sheet of paper or plastic).

The citations provided herein are hereby incorporated by reference for the cited subject matter.

The invention claimed is:

1. A fence comprising a plurality of walls arranged to form a perimeter, wherein:
   a. the plurality of walls comprises a pair of lateral walls and a pair of longitudinal walls;
   b. one or both of the lateral walls comprises a height that is less than a height of each of the longitudinal walls;
   c. the perimeter is a rectangle;
   d. at least one of the lateral walls comprises a plurality of sections of wall;
   e. the plurality of sections comprises a first section, a second section, and a third section, each having respective heights;
   f. the first section has a height that is less than the second section and less than the third section;
   g. the first section is located between the second section and the third section;
   h. the at least one of the lateral walls is tapered in height from the first section to the second section and tapered in height from the first section to the third section;
   i. the height of the first section is less than half the height of the longitudinal walls;
   j. the fence comprises a base and an open-top;
   k. the fence is configured such that the perimeter formed by the plurality of walls can surround a food pan selected from the food pans listed in Table 1, wherein the food pan has outer lip dimensions listed in Table 1 for the food pan and wherein the outer lip dimensions comprise a longer lip dimension and a shorter lip dimension,
   l. the longitudinal walls each have a length that is:
      i. no less than the longer outer lip dimension of said food pan; and
      ii. less than 20% greater than the longer outer lip dimension of said food pan; and
   m. the lateral walls each have a length that is:
      i. no less than the shorter outer lip dimension of said food pan; and
      ii. less than 20% greater than the shorter outer lip dimension of said food pan.

2. The fence of claim 1, further comprising an inner lip located at the base.

3. The fence of claim 1, wherein the longitudinal walls have a height of 2 in to 5 in.

4. The fence of claim 1, wherein first section has a height of about ¼ in to about 1½ in.

5. The fence of claim 4, wherein the longitudinal walls have a height of 2 in to 5 in.

6. The fence of claim 5, further comprising an inner lip located at the base.

7. The fence of claim 1, wherein the fence is made from sheet metal.

8. The fence of claim 1, wherein the longer outer lip dimension is 21 inches and the shorter outer lip dimension is 12 and ⅞ inches.

9. The fence of claim 1, wherein the longer outer lip dimension is 21 inches and the shorter outer lip dimension is 6 and ⅜ inches.

10. The fence of claim 1, wherein the longer outer lip dimension is 12 and ⅞ inches and the shorter outer lip dimension is 10 and ⅞ inches.

11. The fence of claim 1, wherein
   a. the longitudinal walls each have a length that is less than 10% greater than the longer outer lip dimension of said food pan; and
   b. the lateral walls each have a length that is less than 10% greater than the shorter of the outer lip dimensions of said food pan.

12. The fence of claim 11, wherein the longer outer lip dimension is 21 inches and the shorter outer lip dimension is 12 and ⅞ inches.

13. The fence of claim 11, wherein the longer outer lip dimension is 21 inches and the shorter outer lip dimension is 6 and ⅜ inches.

14. The fence of claim 11, wherein the longer outer lip dimension is 12 and ⅞ inches and the shorter outer lip dimension is 10 and ⅞ inches.

15. The fence of claim 1, wherein
   a. the longitudinal walls each have a length that is less than 5% greater than the longer outer lip dimension of said food pan; and
   b. the lateral walls each have a length that is less than 5% greater than the shorter of the outer lip dimensions of said food pan.

16. The fence of claim 15, wherein the longer outer lip dimension is 21 inches and the shorter outer lip dimension is 12 and ⅞ inches.

17. The fence of claim 15, wherein the longer outer lip dimension is 21 inches and the shorter outer lip dimension is 6 and ⅜ inches.

18. The fence of claim 15, wherein the longer outer lip dimension is 12 and ⅞ inches and the shorter outer lip dimension is 10 and ⅞ inches.

19. The fence of claim 15, wherein the longitudinal walls have a height of 2 in to 5 in.

20. The fence of claim 11, wherein the longitudinal walls have a height of 2 in to 5 in.

\* \* \* \* \*